US012749984B2

(12) United States Patent
Sigamani

(10) Patent No.: US 12,749,984 B2
(45) Date of Patent: Sep. 29, 2026

(54) MULTI-PHASE VOLTAGE CONVERTER CURRENT BALANCING

(71) Applicant: Astec International Limited, Kowloon (HK)

(72) Inventor: James Sigamani, Manila (PH)

(73) Assignee: Astec International Limited, Kowloon (HK)

( * ) Notice: Subject to any disclaimer, the term of this patent is extended or adjusted under 35 U.S.C. 154(b) by 169 days.

(21) Appl. No.: 18/893,472

(22) Filed: Sep. 23, 2024

(65) Prior Publication Data

US 2025/0015726 A1 Jan. 9, 2025

Related U.S. Application Data

(63) Continuation of application No. 17/823,849, filed on Aug. 31, 2022, now Pat. No. 12,101,032.

(51) Int. Cl.
*H02M 3/335* (2006.01)
*H02M 3/00* (2006.01)

(52) U.S. Cl.
CPC ......... *H02M 3/33571* (2021.05); *H02M 3/01* (2021.05)

(58) Field of Classification Search
CPC ............................ H02M 3/01; H02M 3/33571
USPC ........................................................... 363/17
See application file for complete search history.

(56) References Cited

U.S. PATENT DOCUMENTS 5,877,951 A 3/1999 Mweene
8,842,449 B1 * 9/2014 Tong .................. H02M 3/3376 363/21.02
9,077,255 B2 7/2015 Fu et al.
9,780,678 B2 10/2017 Adragna et al.
10,069,397 B2 9/2018 Vaidya et al.
10,181,732 B2 1/2019 Eckert et al.
10,593,566 B2 3/2020 Parrish et al.
(Continued)

FOREIGN PATENT DOCUMENTS

CA 3126832 A1 * 7/2020 ............. B60L 53/20
CN 106300957 A 1/2017
CN 108964478 A 12/2018

OTHER PUBLICATIONS

Yang Jiao, et al.; Topology Evaluation and Comparison for Isolated Multilevel DC/DC Converter for Power Cell in Solid State Transformer; IEEE; 2019; 8 pages.
(Continued)

*Primary Examiner* — Yemane Mehari

(57) ABSTRACT

A transformer for a multi-phase power supply circuit includes a core body and a plurality of primary coil assemblies. The core body includes a first base portion having a plurality of core legs joined thereto and a second base portion having a plurality of core legs joined thereto. Each primary coil assembly of the plurality of primary coil assemblies includes a first primary winding having a respective core leg of the plurality of core legs of the first base portion extending therethrough and comprising a first node and a second node and includes a second primary winding having a respective core leg of the plurality of core legs of the second base portion extending therethrough and comprising a first node and a second node. The second nodes of the first primary windings are electrically coupled together, and the first nodes of the second primary windings are electrically coupled together.

20 Claims, 8 Drawing Sheets

(56) References Cited

U.S. PATENT DOCUMENTS

| | | | | |
|---|---|---|---|---|
| 11,146,176 | B2 | 10/2021 | Sigamani | |
| 11,557,976 | B2 | 1/2023 | Sigamani | |
| 12,231,051 | B2 * | 2/2025 | Sato | H02M 3/285 |
| 2007/0086224 | A1 * | 4/2007 | Phadke | H02M 3/285<br>363/65 |
| 2009/0303753 | A1 | 12/2009 | Fu et al. | |
| 2010/0328968 | A1 * | 12/2010 | Adragna | H02M 3/01<br>363/21.02 |
| 2014/0218973 | A1 | 8/2014 | Popovici et al. | |
| 2020/0007050 | A1 | 1/2020 | Fu et al. | |
| 2020/0228022 | A1 | 7/2020 | Hu et al. | |
| 2020/0328696 | A1 * | 10/2020 | Dehem | H02M 3/33571 |
| 2020/0366211 | A1 | 11/2020 | Zhang et al. | |

OTHER PUBLICATIONS

Zong et al.; Three-level Frequency-Doubling LLC Resonant Converter with High Step-down Ration for High Input Voltage Applications; IEEE; 2014; 6 pages.

* cited by examiner

MULTI-PHASE VOLTAGE CONVERTER CURRENT BALANCING

CROSS-REFERENCE TO RELATED APPLICATIONS

This application claims the benefit of and priority to U.S. application Ser. No. 17/823,849, filed Aug. 31, 2022. The entire disclosure of the above application is incorporated herein by reference.

TECHNICAL FIELD

Aspects of the disclosure are related to electronic components and in particular to components for three-phase power systems.

BACKGROUND

Three-phase LLC power converters are commonly used in a variety of systems including telecom systems, fast chargers for electric vehicles, and other applications requiring high power density and high efficiency.

These three-phase LLC power converters typically include an inductor/transformer pair for each of the three phases. Current imbalance circulating among the primary currents due to differences in component value tolerances can negatively impact the converter efficiency and can even cause the converter to fail.

SUMMARY

In accordance with one aspect of the present disclosure, a transformer for a multi-phase power supply circuit includes a core body and a plurality of primary coil assemblies. The core body includes a first base portion having a plurality of core legs joined thereto and a second base portion having a plurality of core legs joined thereto. Each primary coil assembly of the plurality of primary coil assemblies includes a first primary winding having a respective core leg of the plurality of core legs of the first base portion extending therethrough and comprising a first node and a second node and includes a second primary winding having a respective core leg of the plurality of core legs of the second base portion extending therethrough and comprising a first node and a second node. The second nodes of the first primary windings are electrically coupled together, and the first nodes of the second primary windings are electrically coupled together.

In accordance with another aspect of the present disclosure, a method of forming a transformer for a multi-phase power supply circuit that comprises winding, about each core leg of a first plurality of core legs of a core body, a respective first primary winding, each first primary winding comprising a first node and a second node. The method also comprises winding, about each core leg of a second plurality of core legs of the core body, a respective second primary winding, each second primary winding comprising a first node and a second node. The second nodes of the first primary winding are electrically coupled together, and the first nodes of the second primary winding are electrically coupled together. The first plurality of core legs are joined to a first base portion of the core body, and the second plurality of core legs are joined to a second base portion of the core body.

In accordance with another aspect of the present disclosure, a three-phase power supply circuit comprises a plurality of LLC resonant voltage converters and a transformer assembly coupled with the plurality of LLC resonant voltage converters. The transformer assembly comprises a core body comprising a first base portion having a plurality of core legs joined thereto and a second base portion having a plurality of core legs joined thereto. The transformer assembly also comprises a plurality of first primary windings, each first primary winding comprising a first node and a second node and comprises a plurality of second primary windings, each second primary winding comprising a first node and a second node. The second nodes of the first primary windings are electrically coupled together, and the first nodes of the second primary windings are electrically coupled together. A respective core leg of the plurality of core legs of the first base portion extends through a respective first primary winding, and a respective core leg of the plurality of core legs of the second base portion extends through a respective second primary winding.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

In the drawings.

Figure 1:
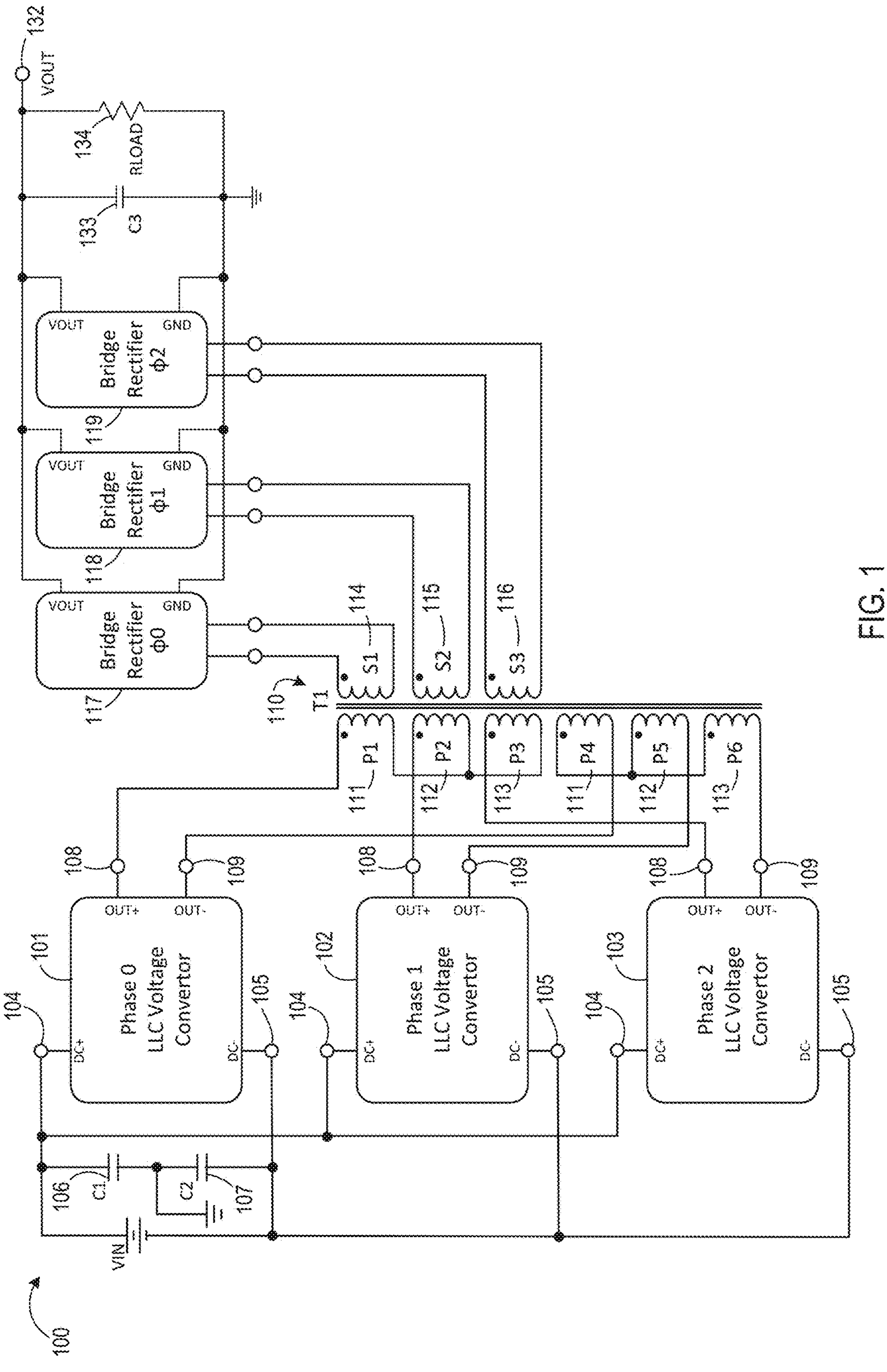
FIG. 1 is an exemplary three-phase power supply circuit including three LLC resonant voltage converters according to an embodiment.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION

Examples of the present disclosure will now be described more fully with reference to the accompanying drawings.

The following description is merely exemplary in nature and is not intended to limit the present disclosure, application, or uses.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

FIG. 1 illustrates an exemplary three-phase power supply circuit 100 including three LLC resonant voltage converters. This example power supply circuit 100 comprises three LLC resonant voltage converters 101, 102, 103, such as the LLC resonant voltage converters of FIGS. 2-10 described below.

Each of the three LLC resonant voltage converters 101, 102, and 103 includes a pair of voltage inputs 104, 105 (DC+ and DC−). An input voltage VIN is applied to the DC+ and DC− inputs 104, 105 of the voltage converters 101, 102, and 103 across capacitors C1 106 and C2 107, which act to divide the input voltage VIN in half when the values of C1 106 and C2 107 are the same.

Each of the three LLC resonant voltage converters 101, 102, and 103 includes a pair of voltage outputs 108, 109 (OUT+ and OUT−). A current generated by a voltage converter (e.g., 101) and supplied via its voltage output OUT+ 108, for example, flows through a transformer assembly T1 110, through the other two voltage converters (e.g., 102, 103), and returns through the voltage output OUT− 109. When supplied via the voltage output OUT− 109, the generated current returns to the voltage output OUT+ 108 after flowing through the voltage converters 102, 103 and the transformer assembly 110. In the embodiments of the voltage converters 101, 102, and 103 disclosed herein, conversion of the input voltage VIN to output currents requires the pair of voltage outputs 108, 109. LLC voltage converters with only a single output electrically coupled with a transformer assembly are not contemplated herein.

Figure 2:
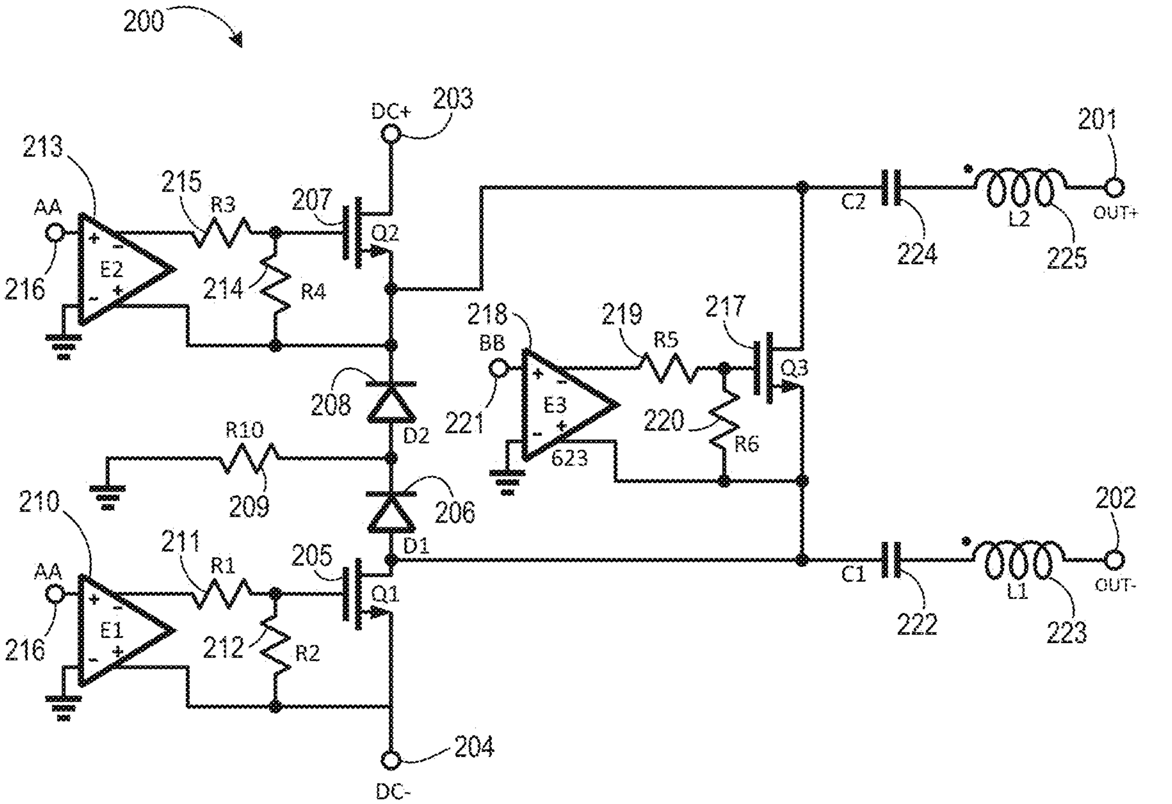
FIG. 2 illustrates an exemplary single-phase LLC resonant voltage converter for use within the three-phase power supply circuit of FIG. 1, 5 or 8 according to an embodiment.

FIG. 2 illustrates an exemplary single-phase LLC resonant voltage converter 200 with a pair of voltage outputs 201, 202 for use within the three-phase power supply circuits disclosed herein. In this example embodiment, an input voltage is applied to inputs DC+ 203 and DC− 204 of the voltage converter 200. In some example embodiments the input voltage may be provided by a power factor correction circuit.

Switch Q1 205 and diode D1 206 make up a first half-bridge, and switch Q2 207 and diode D2 208 make up a second half-bridge. Diodes D1 206 and D2 208 are blocking diodes, which block current when switches Q1 205 and Q2 207 are turned on simultaneously. In one embodiment, a resistor R10 209 is included between diodes D1 206 and D2 208 to couple them to ground. In another embodiment, diodes D1 206 and D2 208 may be coupled to ground directly without resistor R10 209.

Switch Q1 205 is driven by isolated driver E1 210 and resistors R1 211 and R2 212. Switch Q2 207 driven by isolated driver E2 213 and resistors R3 214 and R4 215. Isolated drivers E1 210 and E2 213 are both driven by square wave AA 216 generated by a control circuit (not shown).

The maximum voltage stress on switches Q1 205 and Q2 207 is equal to half of the input voltage between DC+ 203 and DC− 204, while switch Q3 217 experiences the entire voltage stress of the input voltage between DC+ 203 and DC− 204. In an example embodiment, when the input voltage between DC+ 203 and DC− 204 is 440 volts, switches Q1 205 and Q2 207 may be rated for 300-400 volts, while Q3 217 is rated for 600-650 volts.

Switch Q3 217 is configured to short diodes D1 206 and D2 208 when it is activated by isolated driver E3 218 and resistors R5 219 and R6 220. Isolated driver E3 218 is driven by square wave BB 221 generated by a control circuit (not shown).

Each half-bridge drives one primary node of a primary coil of an external transformer through a capacitor/inductor pair. The first half-bridge comprising switch Q1 205 and diode D1 206 drives the external transformer primary coil through split resonant components capacitor C1 222 and inductor L1 223, electrically coupled in series. The second half-bridge comprising switch Q2 207 and diode D2 208 drives the external transformer primary coil through split resonant components capacitor C2 224 and inductor L2 225, electrically coupled in series. Output voltages OUT+ 201 and OUT− 202 are provided to the first and second nodes of the primary coil assembly of an external transformer assembly as described herein. In the embodiment illustrated in FIG. 2, a resonant tank portion of the LLC resonant voltage converter 200 includes capacitors 222, 224 and inductors 223, 225.

Figure 3:
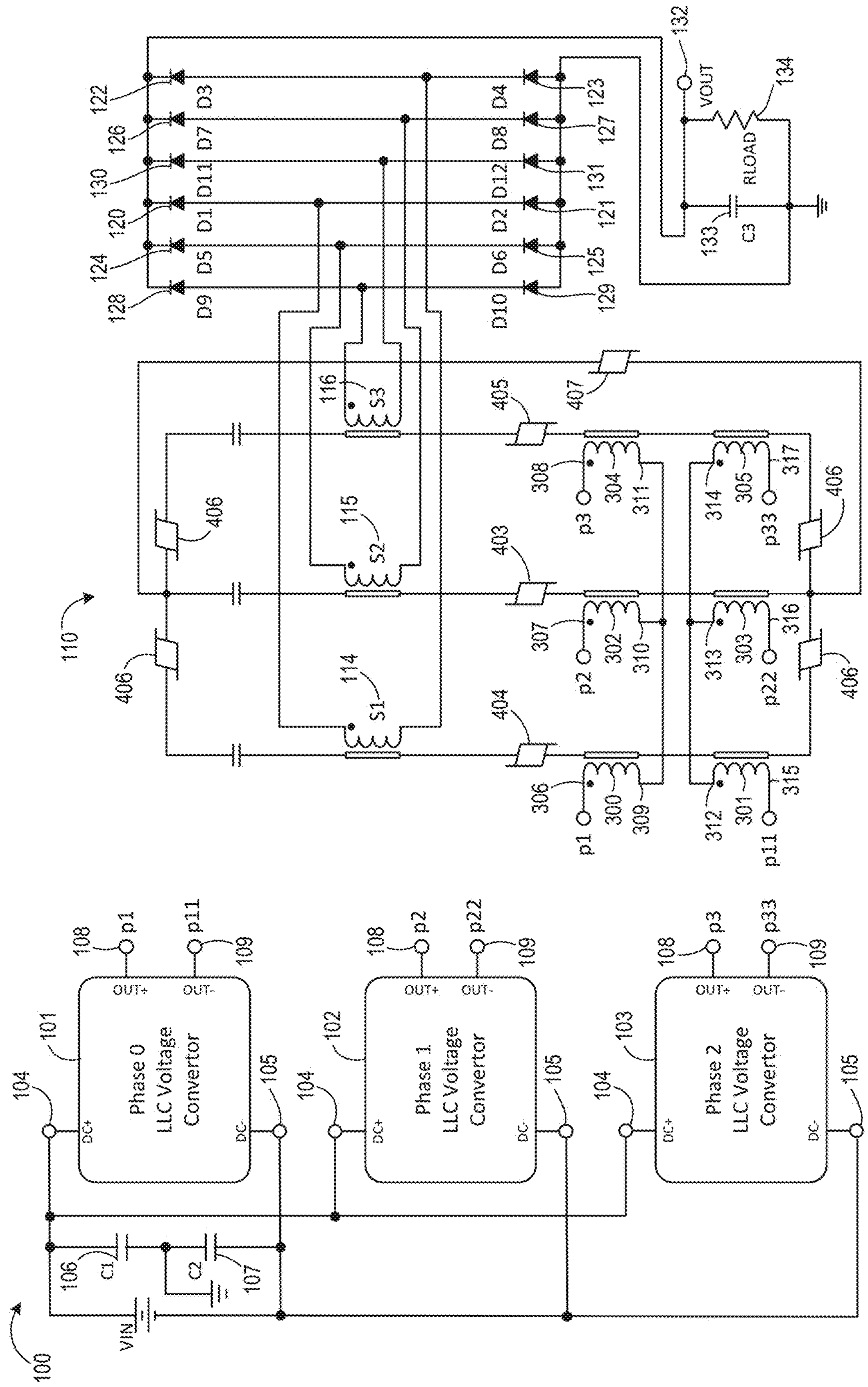
FIG. 3 is an embodiment of the three-phase power supply circuit of FIG. 1 according to an example.

Referring back to FIG. 1 and to FIG. 3, the voltage outputs 108, 109 of each LLC resonant voltage converter 101-103 is electrically coupled with a respective primary winding assembly 111, 112, 113 of the transformer assembly 110. In a multi-phase interleaved LLC resonant voltage converter power supply such as that illustrated in FIG. 1, a current imbalance circulating among the primary currents due to differences in component value tolerances can negatively impact the converter efficiency. Accordingly, embodiments of the transformer assembly 110 disclosed herein combat current imbalance. As illustrated, the primary winding assembly 111 is formed from a pair of primary windings P1 300 and P4 301, the primary winding assembly 112 is formed from a pair of primary windings P2 302 and P5 303, and the primary winding assembly 113 is formed from a pair of primary windings P3 304 and P6 305. Thus, the primary winding assembly coupled to each LLC voltage converter includes a pair of primary windings.

Primary winding P1 300 includes a first node 306 at its dot end electrically coupled with the voltage output 108 of the LLC resonant voltage converter 101. Primary winding P2 302 includes a first node 307 at its dot end electrically coupled with the voltage output 108 of the LLC resonant voltage converter 102. Primary winding P3 304 includes a first node 308 at its dot end electrically coupled with the voltage output 108 of the LLC resonant voltage converter 103. Second nodes 309, 310, 311 opposite the dot ends of the primary windings P1-P3 are electrically coupled together.

First nodes 312, 313, 314 at the dot ends of the primary windings P4-P6 are electrically coupled together. Primary winding P4 301 includes a second node 315 opposite its dot end electrically coupled with the voltage output 109 of the LLC resonant voltage converter 101. Primary winding P5

303 includes a second node 316 opposite its dot end electrically coupled with the voltage output 109 of the LLC resonant voltage converter 102. Primary winding P6 305 includes a second node 317 opposite its dot end electrically coupled with the voltage output 109 of the LLC resonant voltage converter 103.

The total primary number of windings is P1+P4=P2+P5=P3+P6. Thus, the primary windings per phase are split into equal halves. In one embodiment, primary windings P1-P6 have an equal number of turns. The electrically coupled finish ends of the first half of windings (e.g., the second nodes 309-311 of windings P1-P3) are shorted together to form one floating star connection. Similarly, the start end of the second half of windings (e.g., the first nodes 312-314 of windings P4-P6) are connected to form another floating star connection. When electrically coupled with LLC voltage converters with split resonant components (e.g., capacitors 222, 224 and inductors 223, 225 of LLC resonant voltage converter 200 of FIG. 2), an advantage related to substantially equal voltages with opposite polarity at the transformer terminals reduce common mode (CM) noise.

Three secondary windings S1-S3 114, 115, 116 of the transformer assembly 110 are inductively coupled with primary winding assemblies 111, 112, 113 and electrically coupled with respective bridge rectifiers 117, 118, 119. A current inductively generated in secondary winding 114 by primary winding assembly 111 drives diodes D1-D4 120-123 of the bridge rectifier 117. A current inductively generated in secondary winding 115 by primary winding assembly 112 drives diodes D5-D8 124-127 of the bridge rectifier 118. A current inductively generated in secondary winding 116 by primary winding assembly 113 drives diodes D9-D12 128-131 of the bridge rectifier 119. The output of the bridge rectifier 119 produces output voltage VOUT 132 across output filter capacitor C3 133 driving load resistance RLOAD 134.

Figure 4:
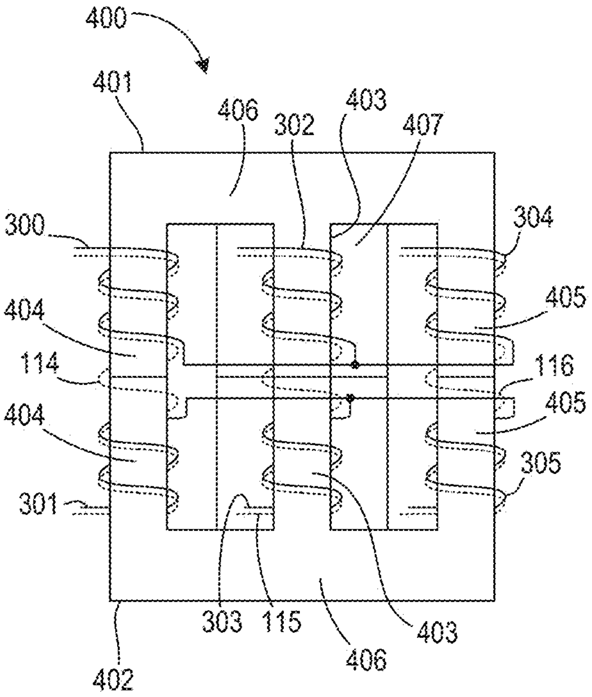
FIG. 4 illustrates a winding arrangement of the transformer assembly of FIG. 3 on an exemplary unified core body according to an embodiment.

As illustrated in FIG. 4, a winding relationship is shown of the primary winding assemblies 111, 112, 113 and secondary windings 114, 115, 116 about a core 400 that together form a three-phase magnetics assembly. The core 400 has an upper E portion 401 and a lower E portion 402. Each portion 401, 402 has a central leg or limb portion 403 and first and second outer legs or limb portions 404, 405. In addition, a base portion 406 of each core portion 401, 402 is joined to the legs 403-405. The arrangement of the primary winding assemblies 111, 112, 113 and secondary windings 114, 115, 116 about the core legs 403-405 results in a sum of the flux in the winding legs that is not zero. As such, a common core return leg 407 is provided for the windings on the core legs 403-405. Magnetic fluxes from the three phases (e.g., LLC resonant voltage converters 101, 102, 103) within the core return leg 407 act to provide a path for the third harmonic flux.

Figure 5:
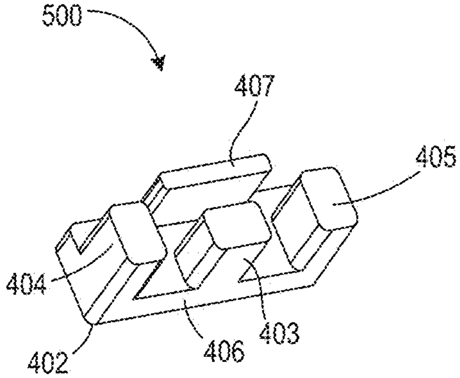
FIG. 5 illustrates an isometric view of a core body portion of FIG. 4 according to an embodiment.

FIG. 5 illustrates an isometric view of a core body 500 of the exemplary lower E portion 402 of the core 400 of FIG. 4 according to an embodiment. Another core body (not shown) mirroring the core body 500 may be used for the upper E portion 401. The two core bodies may have the respective primary windings 300-305 wound thereabout together with the secondary windings 114-116 and joined to form the completed core 400 illustrated in FIG. 4.

Figure 6:
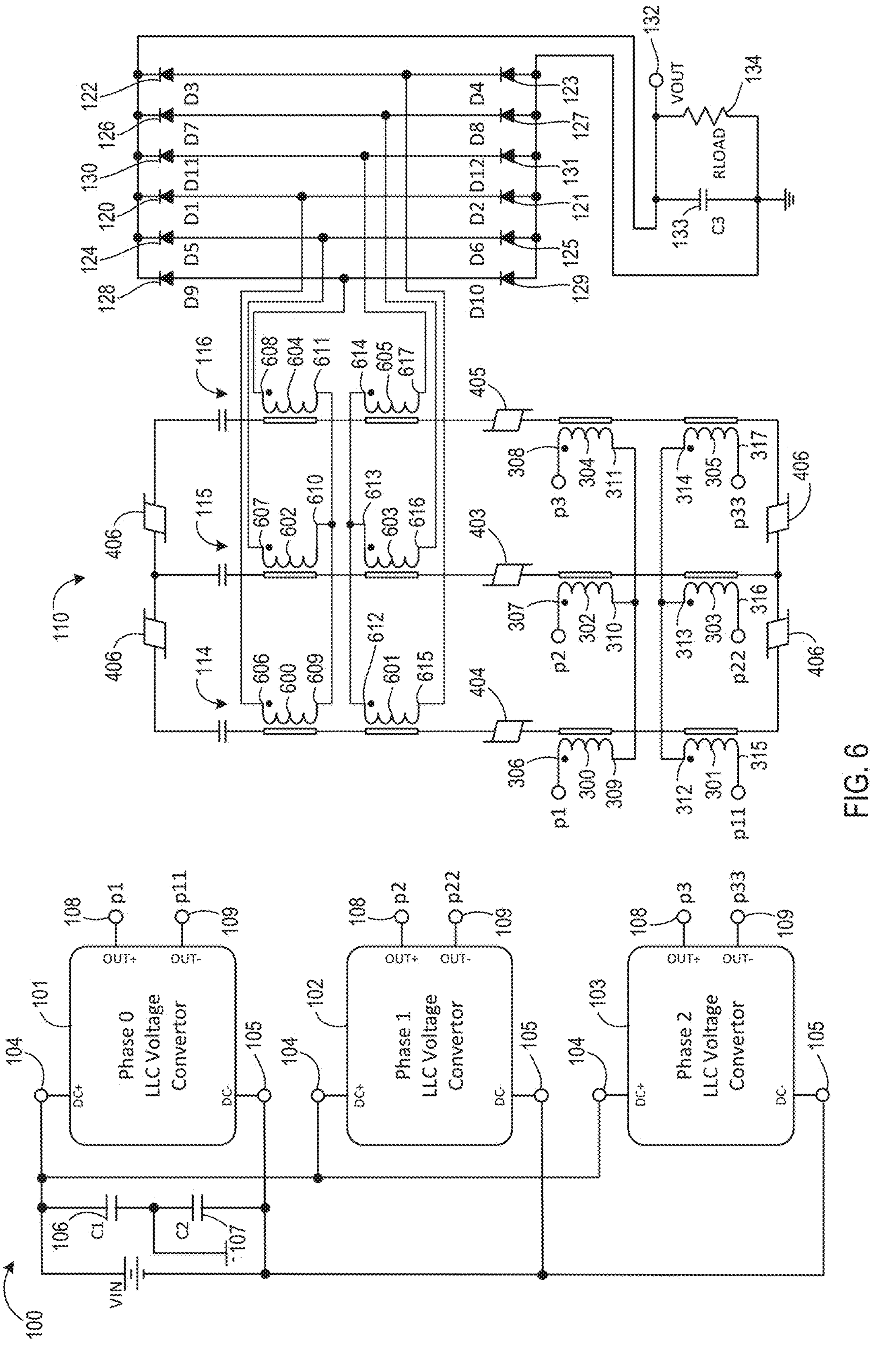
FIG. 6 is an embodiment of the three-phase power supply circuit of FIG. 1 according to another embodiment.

FIG. 6 illustrates an embodiment of the three-phase power supply circuit of FIG. 1 according to another embodiment. Similar to the embodiment illustrated in FIG. 3, the power supply circuit of FIG. 4 includes star-connected primary windings 300-305. In addition, the secondary winding assemblies 114-116 are also star-connected.

As illustrated, the secondary winding assembly 114 is formed from a pair of secondary windings P1 600 and P4 601, the secondary winding assembly 115 is formed from a pair of secondary windings P2 602 and P5 603, and the secondary winding assembly 116 is formed from a pair of secondary windings P3 604 and P6 605. Thus, the secondary winding assembly coupled to each bridge rectifiers 117-119 includes a pair of secondary windings.

Secondary winding 600 includes a first node 606 at its dot end electrically coupled with the diode pair D1, D2 of the bridge rectifier 117. Secondary winding 602 includes a first node 607 at its dot end electrically coupled with diode pair D5, D6 of the bridge rectifier 118. Secondary winding 604 includes a first node 608 at its dot end electrically coupled with the diode pair D9, D10 of the bridge rectifier 119. Second nodes 609, 610, 611 opposite the dot ends of the secondary windings 600, 602, 604 are electrically coupled together.

First nodes 612, 613, 614 at the dot ends of the secondary windings 601, 603, 605 are electrically coupled together. Secondary winding 601 includes a second node 615 opposite its dot end electrically coupled with the diode pair D3, D4 of the bridge rectifier 117. Secondary winding 603 includes a second node 616 opposite its dot end electrically coupled with the diode pair D7, D8 of the bridge rectifier 118. Secondary winding 605 includes a second node 617 opposite its dot end electrically coupled with the diode pair D11, D12 of the bridge rectifier 119.

Figure 7:
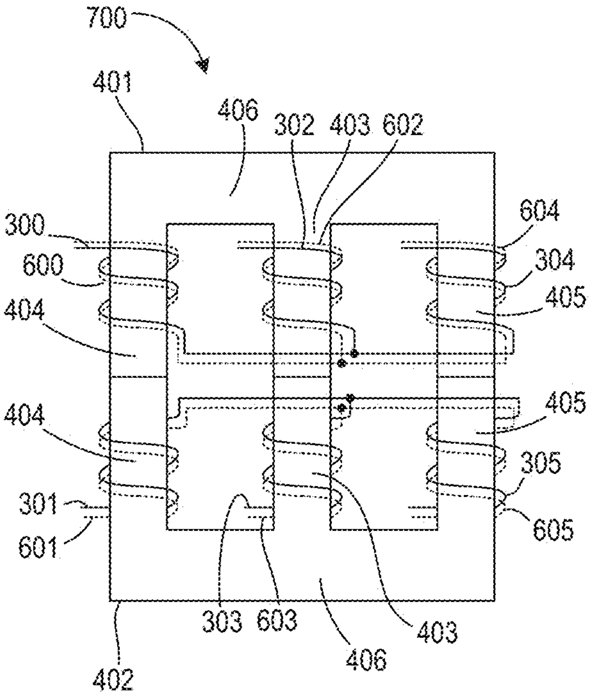
FIG. 7 illustrates a winding arrangement of the transformer assembly of FIG. 6 on an exemplary unified core body according to an embodiment.
Figure 8:
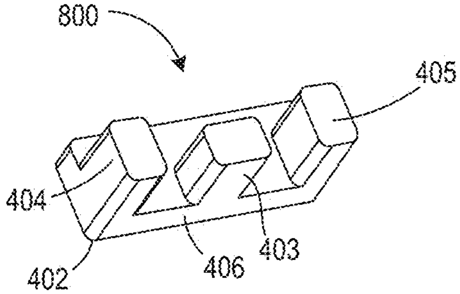
FIG. 8 illustrates a partial isometric view of the exemplary unified core body of FIG. 7 according to an embodiment.

As illustrated in FIG. 7, a winding relationship is shown of the primary winding assemblies 111, 112, 113 and secondary winding assemblies 114, 115, 116 about a core 700 that together form a three-phase magnetics assembly. As described above with respect to FIGS. 4 and 5, the sum of the flux in the winding legs is not zero. In contrast and with regard to the circuit arrangements illustrated in FIGS. 6 and 7, because of the star connection of both the primary windings 300-305 and the secondary windings 600-602 and 603-605, the sum of the flux in the winding legs is zero or a negligible value. Thus, the core 700 may be implemented using the structure of the core 400 of FIG. 4 without the core return leg 407. Thus, FIG. 8 illustrates an isometric view of a core body 800 of the exemplary lower E portion 402 of the core 700 that includes the legs 403-405 about which the primary and secondary winding assemblies 111-116 are wound. The core return leg 407 of FIG. 5 is not needed.

Figure 9:
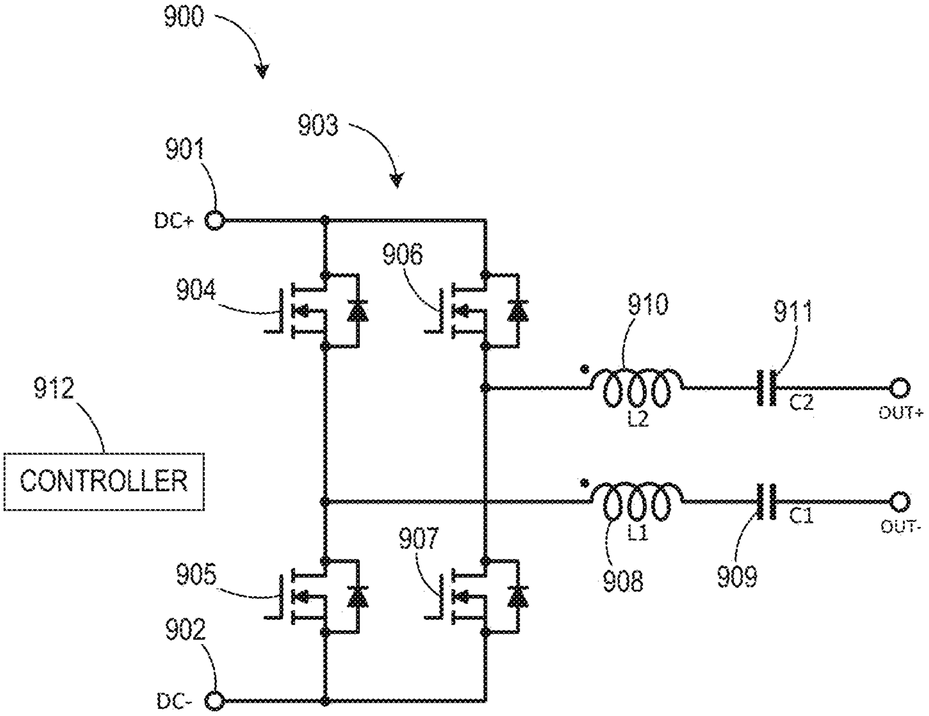
FIG. 9 illustrates an exemplary single-phase LLC resonant voltage converter for use within the three-phase power supply circuit of FIG. 1, 3 or 6 according to an embodiment.

FIG. 9 illustrates an exemplary single-phase LLC resonant voltage converter 900 for use as an LLC resonant voltage converter (e.g., such as converters 101, 102, 103) according to an embodiment. The LLC voltage converter 900 is shown implemented as a resonant full-bridge LLC series converter and has a voltage input formed from a pair of voltage input terminals DC+ and DC− 901, 902 that are couplable with the input voltage VIN illustrated in FIG. 1. The LLC voltage converter 900 includes a switching bridge 903 having a first pair of power switches 904, 905 coupled in series and in parallel with the respective voltage inputs and a second pair of power switches 906, 907 coupled in series and in parallel with the respective voltage inputs. A first resonant inductor 908 is serially coupled between the first pair of power switches 904, 905 and a first resonant capacitor 909. A second resonant inductor 910 is serially coupled between the second pair of power switches 906, 907 and a second resonant capacitor 911.

A controller 912 is coupled to control the power switches 904-907 using pulse-width modulation (PWM) signals in a synchronous manner such that power conversion in the voltage converter 900 is in out of phase with the power conversion in the other voltage converters 102, 103 such as with a phase difference of 120°. For example, the PWM signals may control the on and off states of the power switches 904, 907 together and the on and off states of the power switches 905, 906 together.

Figure 10:
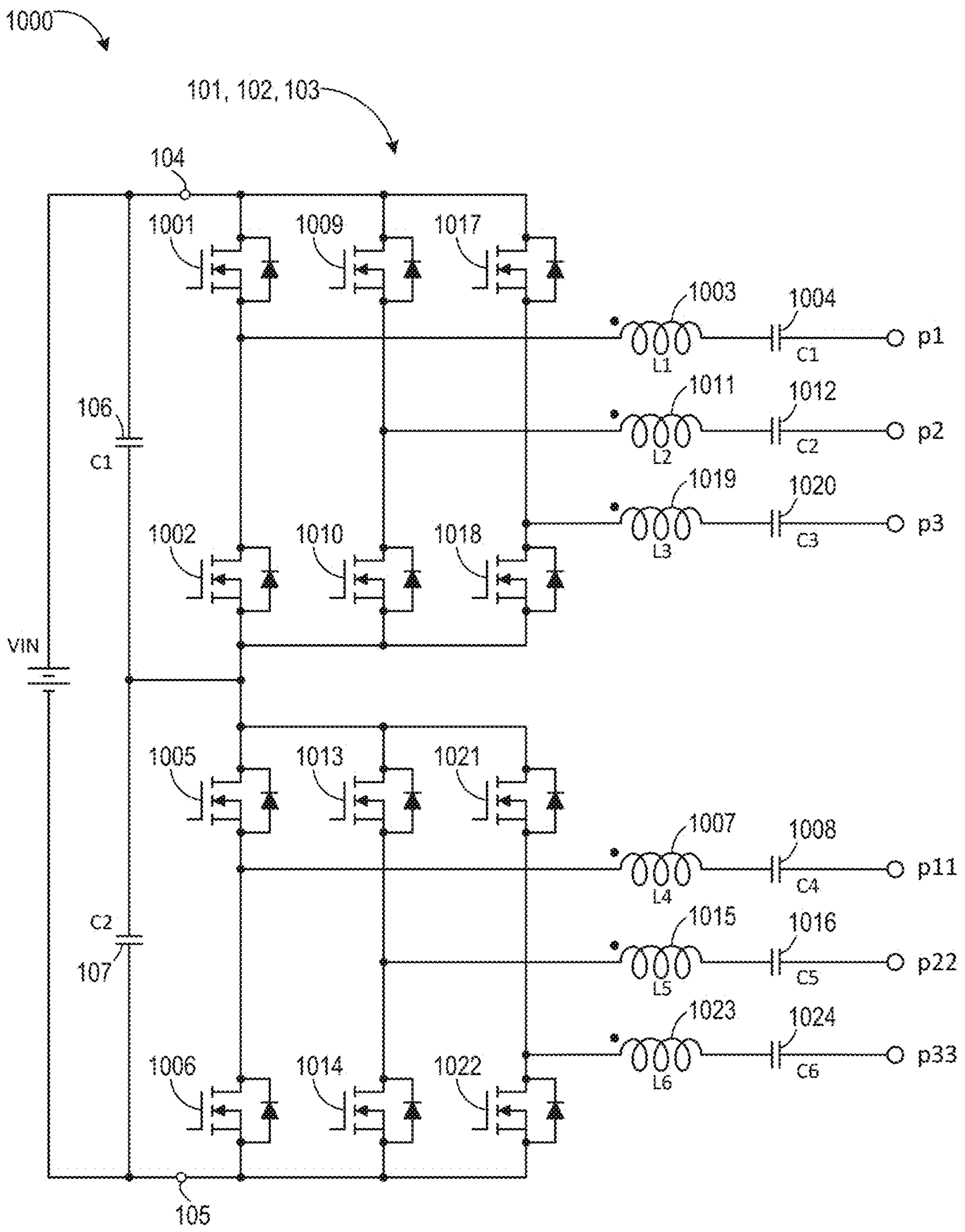
FIG. 10 illustrates an exemplary three-phase LLC resonant voltage converter for use within the three-phase power supply circuit of FIG. 1, 3 or 6 according to an embodiment.

FIG. 10 illustrates an exemplary three-phase LLC resonant voltage converter 1000 according to another embodiment. In this embodiment, each of the LLC resonant voltage converters 101-103 includes two sets of power switch pairs coupled with respective resonant inductors and capacitors. The LLC resonant voltage converter 101 includes a first pair of power switches 1001, 1002 coupled with a resonant inductor 1003 and a resonant capacitor 1004. The LLC resonant voltage converter 101 also includes a second pair of power switches 1005, 1006 coupled with a resonant inductor 1007 and a resonant capacitor 1008. The LLC resonant voltage converters 102, 103 are similarly constructed. For example, the LLC resonant voltage converter 102 includes power switches 1009, 1010, resonant inductor 1011, and resonant capacitor 1012 in a first arrangement and includes power switches 1013, 1014, resonant inductor 1015, and resonant capacitor 1016 in a second arrangement. The LLC resonant voltage converter 103 includes power switches 1017, 1018, resonant inductor 1019, and resonant capacitor 1020 in a first arrangement and includes power switches 1021, 1022, resonant inductor 1023, and resonant capacitor 1024 in a second arrangement. As illustrated, the first pairs of power switches ((1001, 1002), (1009, 1010), (1017, 1018)) are coupled in parallel, and the second pairs of power switches ((1005, 1006), (1013, 1014), (1021, 1022)) are coupled in parallel. The first pairs of switches are further coupled in series with the second pairs of power switches. Additionally, the series-connected first and second pairs of switches are coupled in parallel with the input voltage VIN.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the invention is not to be seen as limited by the foregoing description but is only limited by the scope of the appended claims.

The invention claimed is:

1. A transformer for a multi-phase power supply circuit, the transformer comprising:

a core body comprising:

a first base portion having a plurality of core legs joined thereto; and a second base portion having a plurality of core legs joined thereto;

a plurality of primary coil assemblies, wherein each primary coil assembly of the plurality of primary coil assemblies comprises:

a first primary winding having a respective core leg of the plurality of core legs of the first base portion extending therethrough and comprising a first node and a second node; and a second primary winding having a respective core leg of the plurality of core legs of the second base portion extending therethrough and comprising a first node and a second node;

wherein the second nodes of the first primary windings are electrically coupled together; and wherein the first nodes of the second primary windings are electrically coupled together.

2. The transformer of claim 1 further comprising a plurality of secondary coil assemblies, wherein each secondary coil assembly of the plurality of secondary coil assemblies comprises:

a first secondary winding having a first node and a second node;

wherein a first portion of each first secondary winding has a respective core leg of the plurality of core legs of the first base portion extending therethrough.

3. The transformer of claim 2, wherein a second portion of each first secondary winding has a respective core leg of the plurality of core legs of the second base portion extending therethrough.

4. The transformer of claim 2, wherein each secondary coil assembly of the plurality of secondary coil assemblies further comprises:

a second secondary winding having a first node and a second node;

wherein each second secondary winding has a respective core leg of the plurality of core legs of the second base portion extending therethrough.

5. The transformer of claim 4, wherein the second nodes of the first secondary windings are electrically coupled together; and wherein the first nodes of the second secondary windings are electrically coupled together.

6. The transformer of claim 1, wherein the core body further comprises a transformer return leg configured to conduct magnetic flux between the first and second base portions.

7. The transformer of claim 6, wherein magnetic fluxes from each of the plurality of primary coil assemblies partially cancel each other within the transformer return leg.

8. A method of forming a transformer for a multi-phase power supply circuit, the method comprising:

winding, about each core leg of a first plurality of core legs of a core body, a respective first primary winding, each first primary winding comprising a first node and a second node;

winding, about each core leg of a second plurality of core legs of the core body, a respective second primary winding, each second primary winding comprising a first node and a second node;

electrically coupling the second nodes of the first primary winding together; and electrically coupling the first nodes of the second primary winding together;

wherein the first plurality of core legs are joined to a first base portion of the core body; and wherein the second plurality of core legs are joined to a second base portion of the core body.

9. The method of claim 8 further comprising winding, about each core leg of the first plurality of core legs, a first portion of a respective first secondary winding, each first secondary winding comprising a first node and a second node.

10. The method of claim 9 further comprising winding a second portion of each first secondary winding about a respective core leg of the second plurality of core legs.

11. The method of claim 9 further comprising winding, about each core leg of the second plurality of core legs, a first portion of a respective second secondary winding, each second secondary winding comprising a first node and a second node.

12. The method of claim 11 further comprising:

electrically coupling the second nodes of the first secondary windings together; and electrically coupling the first nodes of the second secondary windings together.

13. A three-phase power supply circuit comprising:

a plurality of LLC resonant voltage converters; and a transformer assembly coupled with the plurality of LLC resonant voltage converters;

wherein the transformer assembly comprises:

a core body comprising:

a first base portion having a plurality of core legs joined thereto; and a second base portion having a plurality of core legs joined thereto;

a plurality of first primary windings, each first primary winding comprising a first node and a second node;

a plurality of second primary windings, each second primary winding comprising a first node and a second node;

wherein the second nodes of the first primary windings are electrically coupled together;

wherein the first nodes of the second primary windings are electrically coupled together;

wherein a respective core leg of the plurality of core legs of the first base portion extends through a respective first primary winding; and wherein a respective core leg of the plurality of core legs of the second base portion extends through a respective second primary winding.

14. The three-phase power supply circuit of claim 13, wherein each first node of the first primary windings is electrically coupled to a first output terminal of a respective LLC resonant voltage converter of the plurality of LLC resonant voltage converters; and wherein each second node of the second primary windings is electrically coupled to a second output terminal of a respective LLC resonant voltage converter of the plurality of LLC resonant voltage converters.

15. The three-phase power supply circuit of claim 13, wherein the transformer assembly further comprises a plurality of secondary coil assemblies;

wherein each secondary coil assembly of the plurality of secondary coil assemblies comprises a first secondary winding having a first node and a second node; and wherein a first portion of each first secondary winding has a respective core leg of the plurality of core legs of the first base portion extending therethrough.

16. The three-phase power supply circuit of claim 15, wherein a second portion of each first secondary winding has a respective core leg of the plurality of core legs of the second base portion extending therethrough.

17. The three-phase power supply circuit of claim 16 further comprising a plurality of bridge rectifiers electrically coupled with the transformer assembly, each bridge rectifier assembly electrically coupled with a respective first secondary winding and comprising:

a first pair of diodes electrically coupled with the first node of the respective first secondary winding; and a second pair of diodes electrically coupled with the second node of the respective first secondary winding.

18. The three-phase power supply circuit of claim 16, wherein the core body further comprises a transformer return leg absent of any primary or secondary winding wound thereabout.

19. The three-phase power supply circuit of claim 15, wherein each secondary coil assembly of the plurality of secondary coil assemblies further comprises:

a second secondary winding having a first node and a second node;

wherein each second secondary winding has a respective core leg of the plurality of core legs of the second base portion extending therethrough;

wherein the second nodes of the first secondary windings are electrically coupled together; and wherein the first nodes of the second secondary windings are electrically coupled together.

20. The three-phase power supply circuit of claim 19 further comprising a plurality of bridge rectifiers electrically coupled with the transformer assembly, each bridge rectifier assembly electrically comprising:

a first pair of diodes electrically coupled with the first node of a respective first secondary winding; and a second pair of diodes electrically coupled with the second node of a respective second secondary winding.

* * * * *